Oct. 12, 1937.  B. C. PLACE  2,095,892
WINDOW CONSTRUCTION
Filed Sept. 20, 1935   2 Sheets-Sheet 1
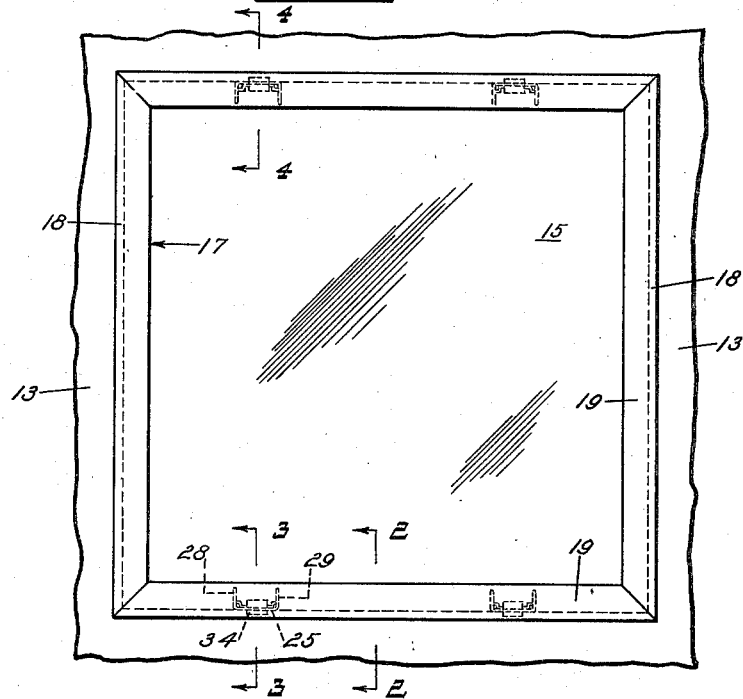
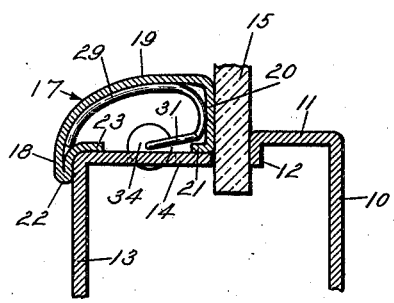
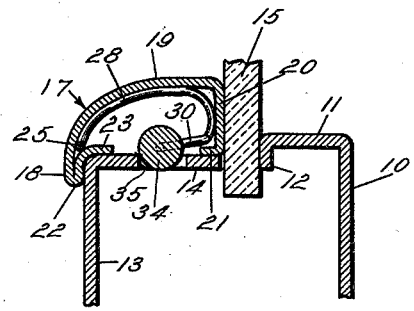
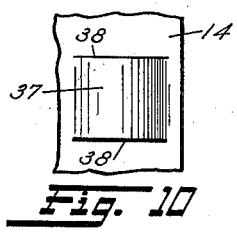
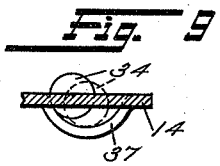
Inventor
Bion C. Place
By Strauch & Hoffman
Attorneys

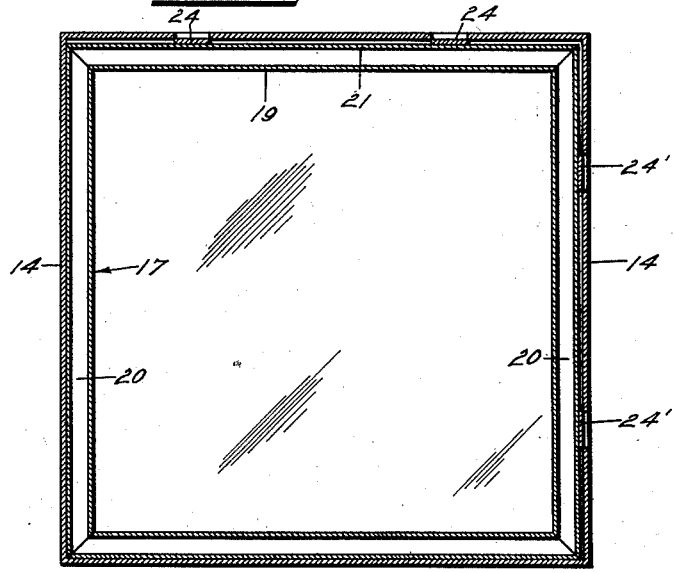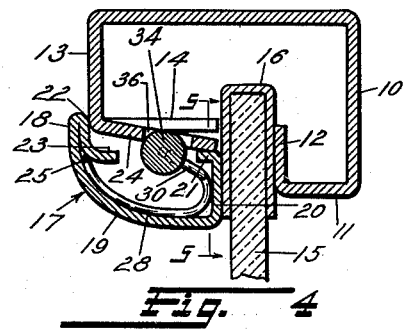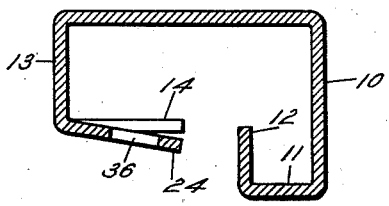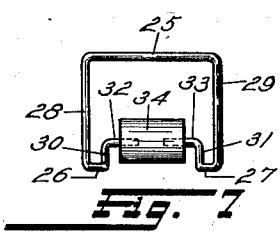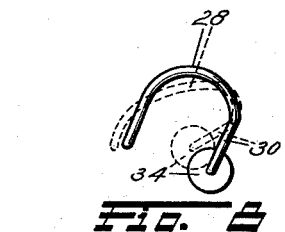

Patented Oct. 12, 1937

2,095,892

UNITED STATES PATENT OFFICE 2,095,892

WINDOW CONSTRUCTION

Bien C. Place, Detroit, Mich., assignor of one-half to George E. Gagnier, Detroit, Mich.

Application September 20, 1935, Serial No. 41,466

16 Claims. (Cl. 189—78)

This invention relates to a window construction for vehicles and, more particularly, to a window construction of the known type in which use is made of a molding in the form of a closed figure to retain the window in its frame.

In my prior Patent #1,906,884 I have disclosed a window construction in which the molding may be secured to the frame by means of spring fasteners that are concealed by the molding and are designed to snap into holding position as soon as the molding is pressed into the position at which it retains the window in the frame. The present invention provides an improvement on the construction of said patent in that by the present invention the construction of the fastening means is designed to facilitate the application of the molding to the frame and to permit it to be more readily removed or detached from the frame when necessity arises.

The present invention also aims to provide a window construction including means to secure the garnish molding designed to maintain the molding in immovable position in the frame regardless of the accuracy of the fit of the molding in the frame.

This invention also provides an improved molding having a part designed to extend into the frame and a part to lap the frame around the window, the latter part being provided to conceal from view any inaccuracy of the fit of the first named part in the frame.

Another object of the invention is to provide an improved window construction in which use is made of spring-pressed rollers to serve to interlock the garnish molding in the window frame, the rollers serving to wedge the molding toward the window as well as to provide an anti-friction element facilitating the insertion and removal of the molding into or out of the frame.

Still another object of the invention is to provide an improved and simplified fastener for securing moldings consisting of a resilient piece of wire and a roller journalled thereon.

A still further object of the invention is to provide a new method of adapting the metal frame of a window construction for the firm and immovable reception of a molding in the form of a closed figure regardless of the fit, within reasonable limits, of the molding therein.

Still further objects of the invention will appear as a description thereof proceeds with reference to the accompanying drawings in which:

Figure 1 is a fragmentary elevational view showing the window construction of the present invention.

Figure 2 is a fragmentary sectional view taken on the plane indicated by the line 2—2 in Figure 1, looking in the direction of the arrows, the scale of said figure being greatly enlarged.

Figure 3 is a fragmentary sectional view similar to Figure 2, taken on the line 3—3 of Figure 1.

Figure 4 is a fragmentary sectional view on an enlarged scale taken on the plane indicated by the line 4—4 in Figure 1, looking in the direction of the arrows.

Figure 5 is a sectional view, taken on the plane indicated by the line 5—5 in Figure 4, illustrating the preferred way of adapting the garnish molding of the present invention to a frame opening in which the molding does not accurately fit.

Figure 6 is a sectional view of the window frame illustrating the preferred mode of adapting the frame for the reception of moldings in the form of a closed figure, regardless of the exact fit of the molding in the frame.

Figure 7 is a plan view of a preferred form of spring fastener preferably utilized to secure the garnish molding in the window frame.

Figure 8 is an end elevation of the fastener illustrated in Figure 7.

Figure 9 is a fragmentary sectional view showing a modified form of roller receiving recess.

Figure 10 is a detail view showing how the roller receiving depressions of Figure 9 are formed.

Like reference characters indicate like parts throughout the various figures.

The present invention is intended particularly for use in automobiles or like vehicle constructions, though it is capable of use in window constructions of all types. Numeral 10 designates the outer window frame member of a vehicle construction. As illustrated member 10 may be provided with an inturned flange 11 terminating in a further inturned flange 12 against which the outside of the pane or window may abut. The inner frame may likewise assume any desired form. Said inner member comprises a portion 13 forming the inner face of the frame adjacent the window and an inturned flange 14 terminating adjacent the sash or window. The sash or window 15 abuts against the flange 12 at the outside and the inside thereof is disposed in close proximity to the edge of the flange 14. If desired, the edge of the sash or pane 15 may be disposed in a channel shaped packing member 16, or thin sheet metal within which the packing is disposed in a manner known in the art. If the pane is intended to slide the said channel, which may assume any known or conventional form, is omitted at the bottom of the pane as illustrated in the drawings.

It is customary in the art, when constructions of the general character above described are used, to retain the pane or window in the frame by means of a molding, such as the molding 17. Said molding is constructed in the form of an open figure corresponding to the outline of the window frame opening. Such moldings are constructed by welding together sections of properly formed sheet metallic strips to form the desired figure. The molding in the form of an open figure serves not only to retain the pane or window in the frame, but to garnish the edges of the frame at the inside of the pane or window.

The molding 17 of the present invention differs from conventional moldings in that it includes a part 18 extending entirely around the molding that laps the window frame around the entire periphery thereof. The molding also comprises a part 19 designed to enter the frame between the flanges 14 of the frame and abut against the pane or window 15. The part 19 is made hollow for the purpose of receiving spring fasteners presently to be referred to.

Such a molding may be conveniently constructed from sheet metal by forming the part 19 from the body of a strip of metal and by bending one edge of the body inwardly providing a portion 20 designed to contact with the pane 15 or the packing 16, when such is used, and by further bending the extreme edge to form a supporting portion 21 designed to rest upon the flange 14 adjacent the window. The part 18 is preferably formed by doubling the opposite edge of the sheet metal strip from which the molding is formed, as indicated at 22, the two thicknesses of metal providing a double flange that provides the desired overlap around the window frame opening. Said edge of the strip from which the molding is formed is also turned inwardly as illustrated in the drawings providing a portion 23 which normally rests upon the flange 14 as illustrated.

It has been found in actual practice that it is extremely difficult to form window frame openings in a vehicle body, or in the doors of such body or the like, of exactly the same size. For this reason moldings in the form of an open figure, intended to retain the window in the frame, are found in actual practice to not infrequently fail to fit the frame opening with reasonable accuracy. It has been found that variations in the size of window frame openings, intended to be of the same size, amount in practice to one-fourth inch or even slightly more. Accordingly, when it is sought to secure a molding in the form of an open figure in such a frame opening it is frequently found that the molding is spaced from the frame. Nevertheless, screws long enough to extend across the space are used to secure the molding in the frame opening, the space, resulting from the approximate fit plainly appearing between the molding and the flange, and the molding being sustained entirely by the screws that extend across said space, and not by contact of the molding with the frame, as contemplated.

In accordance with the present invention adequate support for the molding, regardless of the fit, is provided by slitting the flange 14 preferably at the top of the frame, and bending tongues 24 from the plane of the flange into the frame opening as illustrated in Figures 5 and 6. Due to the inherent resilience of the metal from which the frame is constructed, the tongues 24 are resilient. Accordingly, though the size of the window opening materially exceeds the size of the molding, the resilient tongues 24, nevertheless, firmly contact with the portion 21 of the molding when it is forced therein. Said tongues will be bent toward the flange 14 during the insertion of the part 19 of the molding in the frame, and, regardless of the fit of the molding in the opening in said frame, will firmly bear upon the upper edge thereof, so that the molding is supported in the frame without capability of movement regardless of the fastening means utilized to secure it in the frame. Of course, if the window frame opening corresponds exactly or substantially coincides with the dimensions of the molding that is used, it will be understood that the tongues 24 are quickly bent back into their original planes, in alignment with the remainder of the flange 14. Nevertheless, when only a reasonably accurate fit is provided between the molding and the frame, said tongues bear upon the edge of the molding with a constantly present yielding pressure that serves to maintain the molding in the opening without capability of movement. If desired, similar tongues 24' may be struck from the flange 14 at one or both sides of the frame as illustrated in Figure 5, if it is desired that the frame shall maintain the molding from lateral movement independently of the fastener, presently to be referred to.

It will be observed that the portion 18 of the molding, that laps the frame around the opening, serves to conceal any space between the molding or the frame and to conceal said tongues so that, regardless of the fit of the portion of the molding that extends within the window frame, a neat appearing, workmanlike assembly results when the molding is secured within the frame.

The molding 17, mounted in the frame in the manner just described may be secured therein in any suitable way. Preferably, spring fasteners of the form illustrated in Figures 7 and 8 of the drawings are used, because such fasteners may be concealed within the hollow molding and will serve to permit the ready application or removal of the molding from the frame. Furthermore, in actual use the fastener about to be described exerts a continuously present pressure pressing the molding toward the window or sash such pressure being effective to automatically take up any wear or lost motion between the pane of glass and the molding.

The preferred form of fastener comprises a wire frame comprising a relatively long straight portion 25 designed to fit in the corner of the molding between the portions 19 and 23. Further longitudinally extending portions 26 and 27 are designed to fit in the opposite corner of the hollow molding between the portions 20 and 21 thereof, the portion 25, on the one hand, and the portions 26 and 27, on the other, being connected by curved connecting parts 28 and 29 bent to conform in whole or in part to the interior configuration of the hollow molding to which the fasteners are to be applied. The wire frame includes further inwardly turned portions 30 and 31 and portions 32 and 33 offset with respect to the portions 26 and 27, the portions 32 and 33 being spaced apart endwise. A roller 34 constituting the other part of the fastener is journalled upon the ends of the portions 32 and 33, which are the ends of the piece of wire from which the fastener frame is constructed. The portions 30 and 31 constitute arms that carry the roller 34, and said arms are bent so that the roller 34 normally projects through the open side of the hollow molding provided by the spacing of the portions 23 and 21 thereof. Said roller yields toward the dotted line position illustrated in Figure 8 when the fastener is forced into its holding position.

The fastener just described is inserted in the hollow molding as illustrated at the points at which openings 35 are provided in the frame for the reception of the rollers. Preferably, at the top of the frame the rollers 34 engage openings 36 formed in the inwardly bent resilient tongues 24, although, if desired, the openings in the frame for the reception of the rollers at the top of the molding may be located in the flange 14 between the tongues 24. Preferably no fasteners are utilized at the sides of the molding; two fasteners at the top and a like number at the bottom generally sufficing to retain the molding within the frame.

In applying the molding to the frame, it is only necessary to exert pressure forcing it within the opening, the rollers, normally protruding out of the molding, being forced inwardly in rolling over the flange 14 and then dropping into the openings provided for their reception. When the rollers are opposite said openings, they snap into the openings, and since the spring arms 30 and 31 urge them downwardly, the rounded surface of the rollers provides a wedge, which, when it is forced into said opening, urges the molding toward the window or pane. As wear occurs, or as the packing surrounding the window is compressed, the rollers are automatically forced further into said openings thus wedging the molding against the frame. In this way wear is automatically compensated for. The molding is so designed that simultaneously the part 18 thereof is forced into contact with the exterior of the frame around the window opening.

In view of the fact that rollers are used to constitute the fastening means, the molding can be removed by prying the molding away from the window, the roller, in such event, rolling over the edge of the opening 36 thus permitting, when necessary, the detachment of the molding from the frame.

Instead of providing the frame with openings 35 or 36 for the reception of the rollers, depressions or recesses 37 may be formed in said frame for this purpose. Said depressions are preferably formed by slitting the frame on parallel lines 38 as shown on Figure 10 and then bending the strip of metal separated from the body inwardly as illustrated in Figure 9, the strip of metal being stretched or elongated in the bending operation. The depression 37 provides a roller receiving socket having a gradually and smoothly inclined surface extending toward the deepest part of the depression. The roller 34 of the spring fastener above described, in the use of this form of the invention, rolls down said incline until the molding abuts against the window or packing. Preferably in new constructions the depression 37 is so formed that the roller 34 does not reach the bottom of the depression when the molding abuts against the window. In use the spring constantly urges the roller toward said bottom, and when the packing is compressed as the result of use or when wear occurs, the roller moves down the incline thus automatically taking up the lost motion between window and frame that would otherwise result. This is an important feature of the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A window construction comprising a frame having an opening, a pane to close said opening, a molding in the form of a closed figure approximately fitting in said opening and holding said pane in said frame, said molding having a part entering said frame and a depending skirt formed to lap said frame around said opening, and resilient means concealed by said skirt to support said molding in said frame regardless of the fit thereof in said opening.

2. A window construction comprising a frame having an opening, a pane to close said opening, a molding in the form of a closed figure approximately fitting in said opening and holding said pane in said frame, said molding having a part entering said frame and a depending skirt formed to lap said frame around said opening, and resilient tongues bent from said frame and concealed by said skirt to yieldingly engage said molding to support it in said frame regardless of the fit thereof in said opening.

3. A window construction comprising a frame having an opening, a window in said opening, a molding in the form of a closed figure disposed in said frame and retaining said window therein, and spring pressed rollers concealed by said molding to lock said molding in said frame.

4. A window construction comprising a frame provided with recesses and having an opening, a window in said opening, a molding in the form of a closed figure disposed in said frame over said recesses, and spring-pressed rollers mounted in said molding and engaging said recesses to maintain said molding in locked engagement with said frame.

5. A window construction comprising a frame provided with inherently resilient tongues struck therefrom, said tongues having recesses formed therein, a molding in the form of a closed figure disposed in said frame and concealing said tongues, and spring-pressed rollers mounted in said molding and engaging said recesses to maintain said molding in locked engagement with said frame while said tongues exert pressure against said molding to hold it in position.

6. A molding for a window opening or the like, comprising a hollow metal structure in the form of a closed figure and shaped to approximately fit within said opening, said structure being open at the side thereof facing said frame when the molding is in applied position, yieldable frames mounted within said molding, and rollers journalled in said frames and protruding through said open side of the molding.

7. A molding for a window opening or the like, comprising a hollow metal structure in the form of a closed figure and shaped to approximately fit within said opening, said structure being open at the side thereof facing said frame when the molding is in applied position, yieldable frames mounted in said molding each constructed of wire, the body of which is bent into the form of a loop and the ends of which are spaced apart, and a roller journalled on each pair of said ends and protruding through the open side of said molding.

8. A window construction comprising a frame surrounding an opening, a window in said opening, a unitary molding to retain said window in said opening, resilient means bearing upon an edge of said molding to hold it firmly regardless of the exact fit of said molding in said frame, and further yielding means to secure said molding from movement out of said frame.

9. A window construction comprising a frame surrounding an opening, a window in said opening, a unitary molding to retain said window in said opening, resilient means bearing upon an edge of said molding to hold it firmly regardless of the exact fit of said molding in said frame, and further yielding means housed by said molding and engaging said resilient means to secure said molding from movement out of said frame.

10. A window construction comprising a frame surrounding an opening, a window in said opening, a unitary molding to retain said window in said opening, resilient tongues struck from said frame and provided with fastener receiving recesses, and yielding fasteners housed by said molding engaging said recesses.

11. A window construction comprising a frame surrounding an opening, a window in said opening, a unitary molding to retain said window in said opening, resilient tongues struck from said frame and provided with fastener receiving recesses, yielding frames mounted within and housed by said molding, and rollers journalled in said frames and engaging said recesses.

12. A window construction, comprising a frame having an opening, a window in said opening, a molding retaining said window in said frame, and means to retain said molding in position comprising a spring-backed fastener housed by said molding and formed to engage a recess in said frame to wedge said molding against said window, said fastener including a roller to permit removal and replacement of said molding.

13. A window construction, comprising a frame having an opening, a window in said opening, a molding retaining said window in said frame, and means to retain said molding in position comprising a spring-backed roller housed by said molding, said roller being mounted for rotation on an axis extending in the direction of the length of said molding and engaging a recess in said frame so as to resiliently urge said molding toward said window.

14. A window construction, comprising a frame having an opening, a window in said opening, a molding retaining said window in said frame, and means to retain said molding in position comprising a resilient wire frame housed by said molding, a roller journalled in said frame for rotation on an axis paralleling said window, and a recess in said frame into which said roller is urged by said wire frame.

15. A spring fastener for a molding comprising a piece of wire bent into a form fitting the interior of the molding, and a roller journalled on said wire and disposed so that said roller can be shifted bodily with respect to the molding in opposition to the inherent resilience of said piece of wire.

16. A window construction comprising a frame having an opening therein, a pane to close said opening, a molding in the form of a closed figure approximately fitting in said opening and holding said pane in said frame, resilient means formed as a part of said frame and contacting said molding regardless of the fit thereof in said opening, and means to conceal the inaccuracies of the fit of said molding in said frame.

BION C. PLACE.